(12) United States Patent
Operowsky et al.

(10) Patent No.: US 7,135,961 B1
(45) Date of Patent: Nov. 14, 2006

(54) METHOD AND SYSTEM FOR PROVIDING DIRECTIONS FOR DRIVING

(75) Inventors: Howard L. Operowsky, Poughkeepsie, NY (US); Edith H. Stern, Yorktown Heights, NY (US); Barry E. Willner, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/676,598

(22) Filed: Sep. 29, 2000

(51) Int. Cl.
*B60Q 1/00* (2006.01)

(52) U.S. Cl. .................. 340/425.5; 340/980; 340/990; 701/208

(58) Field of Classification Search ............. 340/425.5, 340/988, 980, 990, 995, 995.1, 995.2; 345/7; 701/201, 208, 213
See application file for complete search history.

(56) References Cited

U.S. PATENT DOCUMENTS

| | | | | |
|---|---|---|---|---|
| 5,051,735 A * | 9/1991 | Furukawa | .................... | 340/980 |
| 5,115,398 A * | 5/1992 | Jong | ........................... | 701/200 |
| 5,177,685 A * | 1/1993 | Davis et al. | ................ | 340/988 |
| 5,198,797 A * | 3/1993 | Daidoji | ........................ | 340/980 |
| 5,343,399 A * | 8/1994 | Yokoyama et al. | ......... | 340/990 |
| 5,422,812 A * | 6/1995 | Knoll et al. | ................ | 340/990 |
| 5,739,773 A * | 4/1998 | Morimoto et al. | .......... | 340/990 |
| 5,774,071 A * | 6/1998 | Konishi et al. | ............. | 340/988 |
| 5,835,881 A * | 11/1998 | Trovato et al. | ............. | 340/988 |
| 6,018,697 A * | 1/2000 | Morimoto et al. | .......... | 340/988 |
| 6,208,932 B1 * | 3/2001 | Ohmura et al. | ............. | 340/988 |
| 6,285,297 B1 * | 9/2001 | Ball | ........................ | 340/932.2 |
| 6,285,317 B1 * | 9/2001 | Ong | ....................... | 342/357.13 |
| 6,414,696 B1 * | 7/2002 | Ellenby et al. | ............. | 715/762 |
| 6,885,939 B1 * | 4/2005 | Schmidt et al. | ............. | 701/211 |
| 6,956,503 B1 * | 10/2005 | Yokokohji et al. | .......... | 340/988 |

* cited by examiner

*Primary Examiner*—John Tweel, Jr.
(74) *Attorney, Agent, or Firm*—Akerman Senterfitt

(57) ABSTRACT

A system and method of providing information (such as directions) to a driver of a vehicle while driving the vehicle without requiring that the driver remove his eyes from looking out the windshield at the road ahead. A positioning device is associated with the vehicle and determines the present location of the vehicle which is compared with a desired location (e.g., the location of a desired turn at an intersection) necessary to reach a preset destination which has been stored. When the vehicle is in a predetermined location (e.g., 500 feet or 10 seconds before the intersection), an advisory message to the driver is projected on the windshield using a heads-up display projector so that the driver can prepare for and make the necessary movement (e.g., turning the correct way at the desired intersection). An optional auditory signal can provide a message indicating the necessary action, either in general or specifically (through a speech synthesizer), with optionally different sound indicators depending on the urgency of the action. A wireless receiver used with the present invention can display other information such as road conditions, traffic and weather information, as well as advertising and e-mail. The present invention contemplates that images of intersections (live pictures, photos or sketches) may be displayed to indicate the proper turn and provide landmark information to assist in determining the appropriate turn.

38 Claims, 5 Drawing Sheets

METHOD AND SYSTEM FOR PROVIDING DIRECTIONS FOR DRIVING

BACKGROUND OF THE INVENTION

1. Field of the Invention

The present invention relates to a system and method for providing information to a driver without requiring that the driver remove his eyes from the road. More particularly, the present invention relates to a system and method for providing information such as navigational information such as directional instructions to a driver based on his position and stored information that will allow the driver to travel in the desired direction without requiring that the driver look away from the windshield.

2. Background Art

Driving to an unknown destination or in an unfamiliar location presents the opportunity for a driver to get lost or to miss his turn. Perhaps the driver was looking for a road by a particular name (e.g., "Main Street" or "Harbor Freeway") and he encounters an intersection without a street sign or with a sign which has another designation (e.g., "Route 1" or "Interstate 5"). The driver does not know whether to turn or drive forward through the intersection, continuing to look for "Main Street" or "Harbor Freeway" because he does not know where Main Street is supposed to be or what the desired intersection is supposed to look like.

Often directions are provided from maps or from verbal instructions without clear and accurate indications as to how far the desired intersection (e.g., "Main Street" or "Harbor Freeway") is from the present location of his vehicle. Even when an accurate and precise indication of distance is given (e.g., "go 2.7 miles from the origin down Center Street until you intersect Main Street and turn right"), the direction would require that the driver note the initial mileage, calculate the destination mileage of 2.7 miles farther and then observe when the 2.7 miles have passed to find Main Street, an activity which might require frequent calculations and attention to the odometer. Obviously, the driver's looking at the odometer requires the driver to remove his eyes from the road to look at the odometer (instead of the traffic on the road). While a good driver will keep the glances at the odometer to a minimum to allow the greatest attention to be focused on the roadway and its ever-changing perils, this presents a distraction.

It would be desirable to have a system of providing directions which allows a driver to enter a destination, then get detailed instructions on how to get there, complete with an appropriate notification of when to turn and which way. Advantageously, these detailed instructions would indicate a necessary turn with an indication provided shortly before the desired turn to allow the driver to concentrate on the driving and the view out the windshield and not on maps or even on a video screen within the car (for example, mounted on the console of the vehicle in the case of a system provided by Hertz and called the "NeverLost" system or in similar navigational aids provided by auto companies such as General Motors). The Hertz NeverLost system includes a route set on a console unit which is used to show messages about turns on the console unit, with a tone indicating that a message has been displayed on the console. However, the console is located away from the windshield and looking at the console requires the driver to remove his eyes from the road.

Anything which distracts the driver's eyes from the road presents a risk of collision or leaving the road. So, if the driver must watch the odometer to know when his turn is expected, he can not be watching the road at the same time. Similarly, if the driver is looking at a map or a display on the console, the driver can't be simultaneously looking at the road.

If, for any reason, the driver should miss a turn, the sooner the driver is alerted to the fact that the turn was missed, the easier and quicker the driver may be able to recover from the mistake.

It would also be desirable to have a system where the driver receives multiple advisory alerts or warnings of an upcoming turn at different distances from the turn and it would be desirable if the advance notice was related to the speed at which the vehicle is approaching the turn. That is, an indication of a turn 100 feet in advance may be adequate where the vehicle is traveling 5 miles per hour (or about 7 feet per second), but an indication of the turn 100 feet in advance of the turn while the vehicle is traveling 70 miles per hour allows only a one second advance notice before the turn, while turning may require more than the second just to decelerate. Accordingly, it would be desirable to provide a notice of a turn at one or more relatively fixed time intervals before the turn (perhaps 15 seconds and 5 seconds before) rather than a predetermined distance before the turn, rather than a fixed distance before a turn. Since the use of location alone provides only the distance, it is necessary to combine the location information with speed information to provide an alert which is based on calculated time to the turn, but this is accomplished using speed information. Speed information can be calculated from past geographic positions or can be obtained from a connection to the vehicle (the speedometer or changes in the odometer).

The description of the present invention which follows is based on a presupposition that the reader has a basic knowledge of global positioning systems and of stored maps which are available over the Internet. Such global positioning systems can provide the present position of a sensor (for example, a sensor mounted within a vehicle) to a very accurate location (perhaps within 10 feet). The positioning information can be stored and used to plot the progress of a vehicle over time by noting the position of the vehicle at successive time intervals. Such a system would allow for the plotting of the circular ramp of a freeway interchange and the calculation of the location of the interchange and the radius of its curvature. Stored maps exist for most cities and main routes between cities and can be accessed in a variety of ways, such as from the Internet from one of a variety of web sites or from map software which is commercially available. These maps can be used for detailed driving instructions by entering a starting location and a desired termination, providing even a listing of the necessary turns and the mileage along each leg of the journey.

Some prior art systems have been proposed which provide driving instructions on a video screen provided in the center console. Such a system has the undesired requirement of periodically requiring the driver's looking at the video screen rather than on the road ahead.

Prior art systems for providing driving instruction in the form of a printed sheet of paper, indicating that the first road is to be taken for 2.7 miles, then turn right on Main Street for 1.6 miles, then turn left (and so forth). The providing of a separate piece of paper with directions also requires that the driver look at the separate piece of paper rather than the road, and the printed sheet of paper does not provide an indication when the desired road is being approached.

Prior art systems exist where a map is provided are similar to those providing a printed sheet of paper. It has the same disadvantages of not providing any indication when the desired road is being approached and in requiring that the driver's attention is diverted from looking at the road to looking at the map.

Thus, the prior art systems have undesirable disadvantages and limitations.

SUMMARY OF THE INVENTION

The present invention overcomes the disadvantages and limitations of the prior art systems by providing a simple, yet effective, way of providing information (including, but not limited to, directional information) to a driver while the driver is operating his vehicle.

The present invention allows the driver to obtain the information on the desired route and necessary turns without removing his eyes from the road.

The present invention also has the advantage of providing the driver with the necessary information on turns at the appropriate time for taking action—neither too early (so the instruction might cause an early turn into the wrong street or be forgotten) or too late (for example, after the opportunity for the turn has passed or when it is too late to get into the correct turning lane).

One additional benefit of the present invention is that the driver may be provided with one or more warnings or alerts on upcoming turns at preset time periods in advance of a calculated turn rather than at preset distances which may require vastly different elapsed times depending on the speed of the vehicle.

The present invention includes a system for displaying driving instructions such as a turn on the windshield in front of the driver so that the driver may view the instruction without removing his eyes from the road. This instruction is preferably in the form of an illustration of the intersection with appropriate landmarks in the form of a picture taken by a camera, although other indicators (such as a word instruction) could be used to advantage if no pictorial illustrations are available. The illustrations could be from a camera in the form of a real time image or from a stored illustration of the intersection, with appropriate landmark information such as street layout and name being preferable but not mandatory.

In one embodiment of the present invention, a supplemental audible indication is provided to the driver. This supplemental audible indication may be a signal (a bell or a stored voice message to the effect of "see message displayed on windshield") or, in the alternative, it could be an audible version of the message displayed on the windshield, created using speech synthesis.

Other objects and advantages of the present invention will be apparent to those skilled in the appropriate art, considering the following description of the present invention taken together with the appended claims and the accompanying drawings.

BRIEF DESCRIPTION OF THE DRAWINGS

Having thus set forth some of the limitations and disadvantages of the prior art and some objects and advantages of the present invention, other objects and advantages will be apparent to those skilled in the relevant art in view of the following description of the drawings illustrating the present invention of an improved routing system and method in which.

DETAILED DESCRIPTION OF THE PREFERRED EMBODIMENT

In the following description of the preferred embodiment, the best implementations of practicing the invention presently known to the inventors will be described with some particularity. However, this description is intended as a broad, general teaching of the concepts of the present invention in a specific embodiment but is not intended to be limiting the present invention to that as shown in this embodiment, especially since those skilled in the relevant art will recognize many variations and changes to the specific structure and operation shown and described with respect to these figures.

Figure 1:
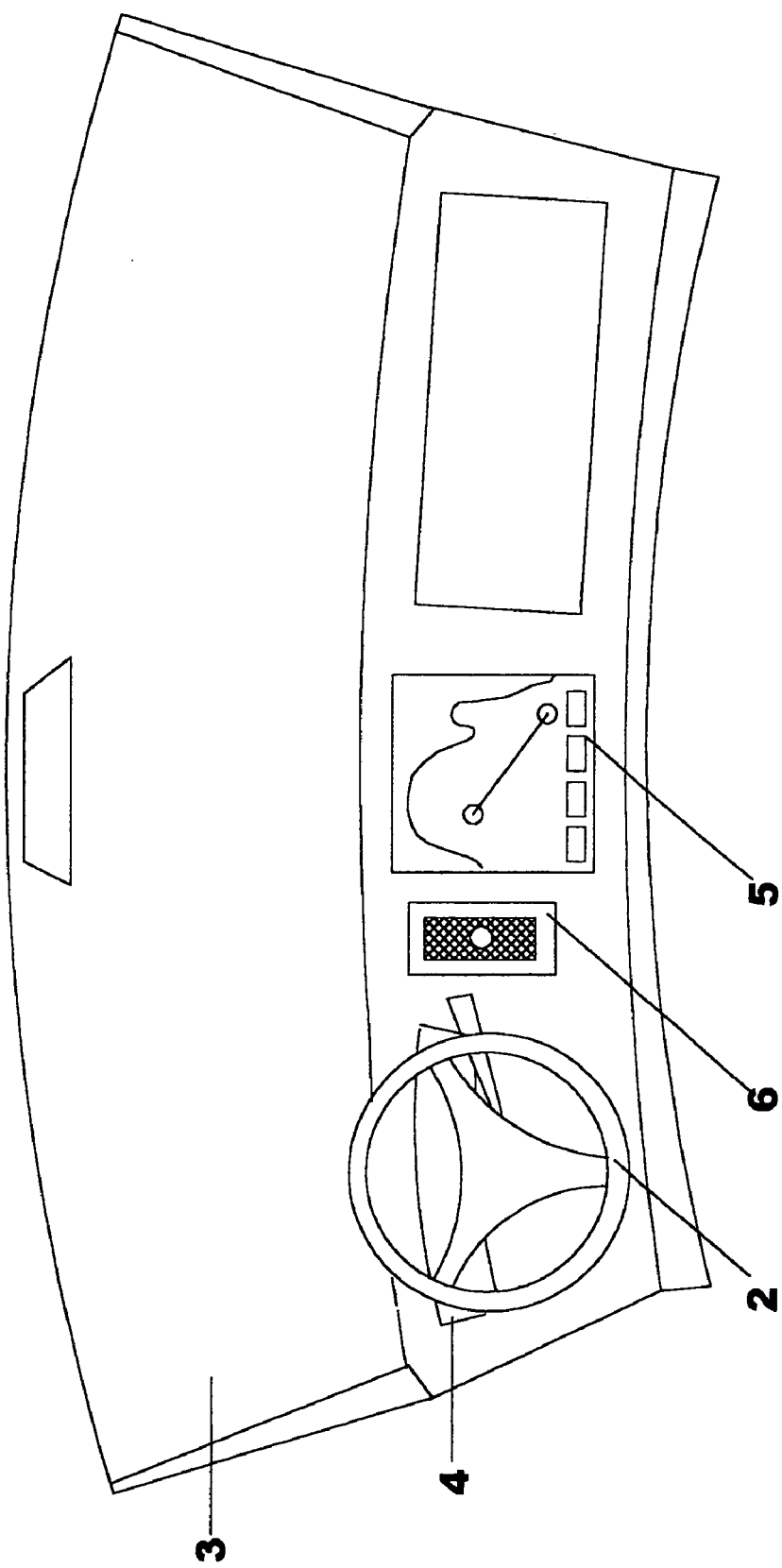
FIG. 1 is a perspective illustration of the front of a vehicle, useful in describing the present invention.

FIG. 1 shows the front interior portion of a vehicle, looking forward (or outward) in the direction of travel from the driver's position. As shown in this vehicle, the driver looks over the steering wheel 2 through a windshield 3 out at the roadway (not shown) in front of the vehicle. An instrument panel 4 is positioned below the windshield and mounted to the dash panel, with the instrument panel including appropriate indicators, gauges, dials and controls for the vehicle, including the odometer which is frequently used by drivers in locating the desired turns. A touch screen 5 is located on the dash panel adjacent the driver's seated position in front of the steering wheel 2 and a speaker 6 is also shown located on the dash panel, although one or more speakers could be positioned at other appropriate locations throughout the interior of the vehicle.

The touch screen 5 may serve as an input device to allow the driver to enter a destination, either directly from a map or from a displayed menu of locations. Alternatively, the directions could be send by wireless means from a transmitter to a wireless receiver located in the vehicle (as described later in connection with FIG. 4) through known technology. If the touch screen 5 includes a menu of destination locations, then the driver may select a destination by touching the touch screen in the respective area, causing the system to identify the destination selected by the driver. Alternatively, the touch screen may include a large-scale map and the driver may select his destination by touching the appropriate area of the map. Once the area has been selected by touching the map or a list of destinations, a more localized map or a more detailed destination list may be presented on the touch screen 5 and a more precise destination selected to allow the destination to be indicated with greater precision. That is, the first menu lists the destinations by category for selection (hotels, office buildings, cities, attractions, etc.) and then when the driver selects a category, a detailed list of destinations within the category is presented for selection. In the presentation of a map, a map showing the main routes and cities within a large scale of 100 miles by 100 miles might be presented, allowing the driver to select a destination region, then a smaller scale (perhaps 10 miles by 10 miles) map of the selected destination region would be presented. The process of providing more precise destination information for selection could be continued to other levels, if desired.

Figure 2:
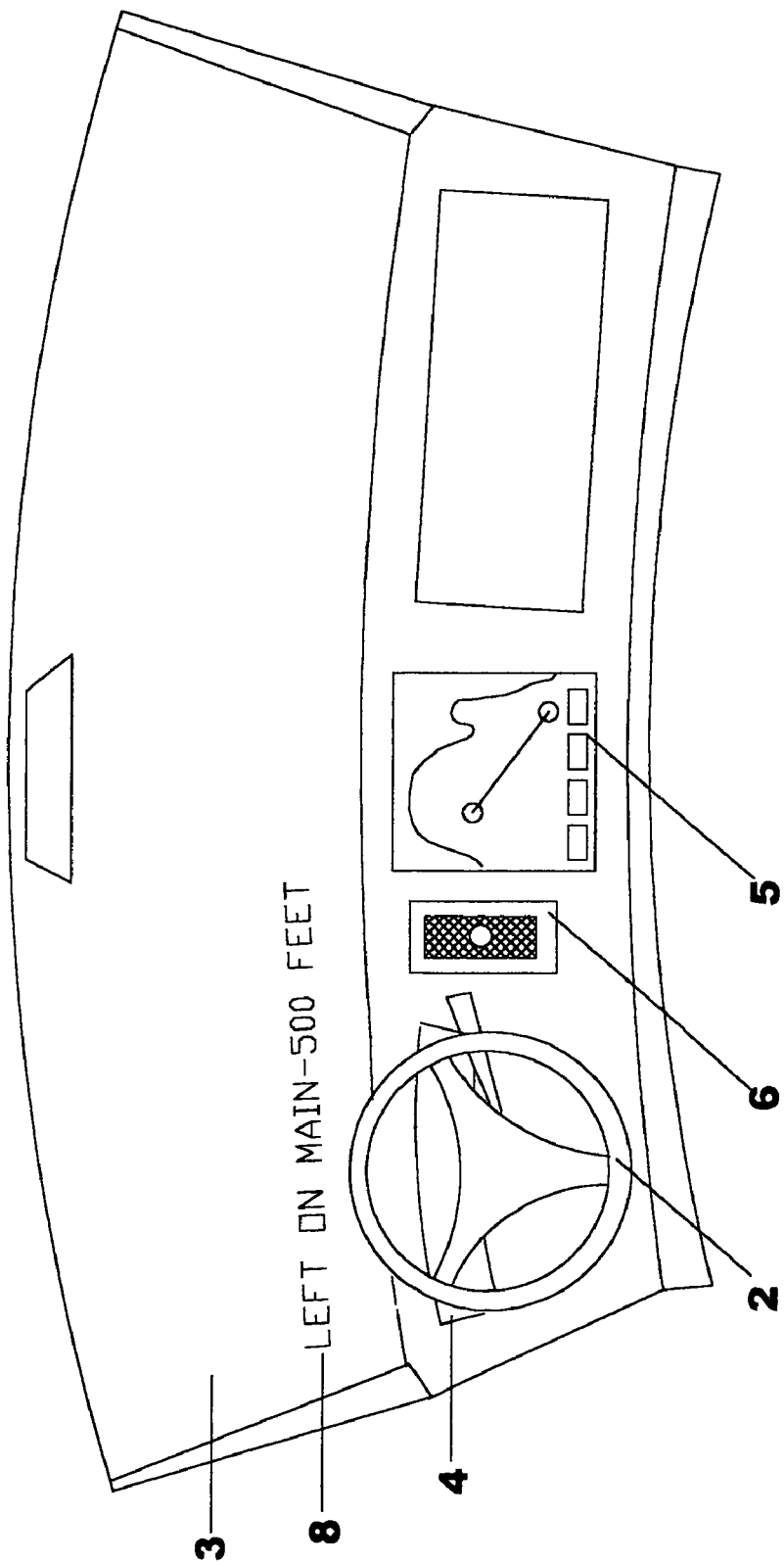
FIG. 2 is a modified view of the front of a vehicle as shown in FIG. 1 with a message regarding driving directions provided to the driver on the windshield.

FIG. 2 illustrates the front interior portion of the vehicle as shown in FIG. 1 with a message 8 projected on the windshield 3 in front of the driver's position. The system for providing such a message will be described in some detail in connection with later figures (particularly FIG. 3) but uses conventional equipment to display a message in an area of the windshield 3 which is within the line of sight of the driver. Since the message is an image projected onto the windshield 3, the driver is able to see through the message. Although the message is projected onto the windshield in the preferred embodiment, a special windshield is not required and no wiring within the windshield is necessary, an advantage since windshields can be damaged and require replacement and special windshields and wiring would add to the cost and difficulty of replacing the windshield 3.

The message 8 on the windshield contains variable information which is generated by a program and which is provided to a projection unit. In the preferred embodiment, the message 8 would include an indication that an action is desired (a turn), what action is desired (a left turn), where (at Main) and how far the action is away (500 feet). The name of the street is a part of the directions which are obtained from a map or driving directions, directions which are not a part of the present invention.

Figure 3:
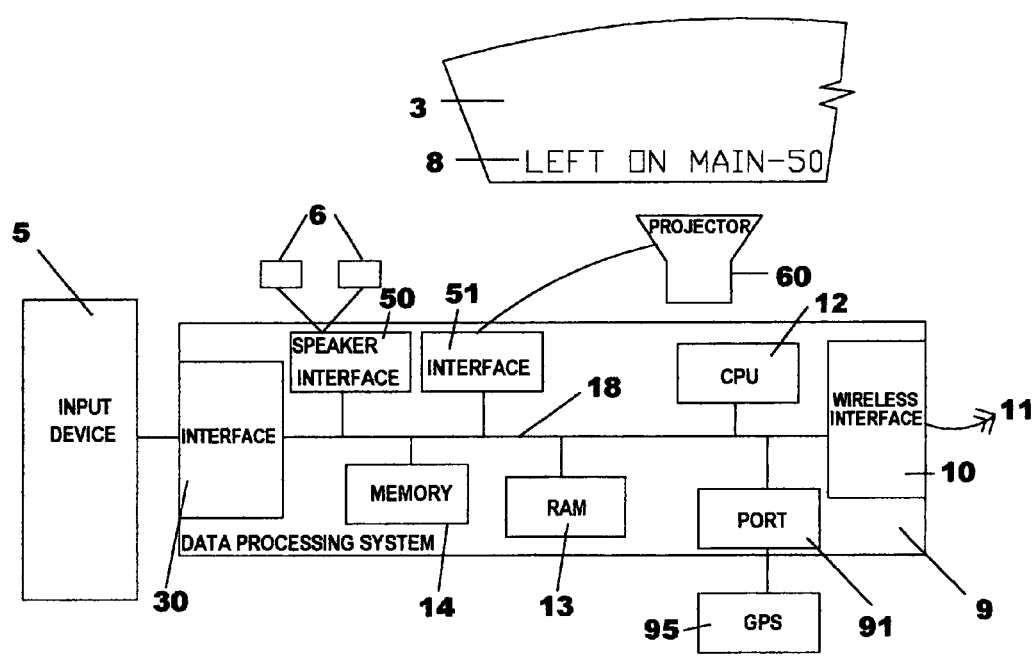
FIG. 3 is a block diagram of a processing system useful in practicing the invention of type described in connection with the providing the message to the driver as illustrated in connection with FIG. 2.

FIG. 3 is a block diagram of a data processing system 9 (also sometimes referred to as an electronics package) for practicing the present invention. In the preferred embodiment, the processing system 9 includes an antenna 11 connected to a wireless interface 10 for receiving and decoding wireless information, for example, map information, transmitted from a remote source. The wireless interface 10 is coupled within the data processing system 9 to a central processing unit (CPU) 12, random access memory or RAM 13 and nonvolatile memory 14 through a bus 18. The nonvolatile memory may be any form of conventional storage for use with a CPU such as disk, flash or other system for storing information in a system which does not erase when the power is removed.

A electronics interface box 30 is also coupled to the bus 18 and provides the necessary conversions for an input device such as a touch screen 5 described in connection with FIG. 1. The electronics interface couples the input device in a known manner, translating the physical input into an analog signal (representing the location of the touch in x and y coordinates), then translates the analog signal indicating the coordinates into digital values for processing by the CPU 12 and storage in the random access memory 13.

Also coupled to the bus 18 are two interface units 50, 51, the first of which (interface unit 50) is operatively connected to drive speaker(s) 6 in response to signal from the CPU 12 through the bus 18. The second interface unit 51 is coupled to a projector 60 such as a heads-up projector. The heads-up projector 60 displays information on the windshield 3, dispatched by the CPU 12 from the RAM 13 to the projector 60 through the interface unit 51.

A global positioning system (GPS) system 95 is coupled to the bus 18 through an interface port 91 in a conventional manner. The GPS system 95 periodically provides the location of the unit (and the associated vehicle) within a small distance (perhaps 30 meters, depending on the accuracy of the GPS system employed). The GPS system provides the location of the unit and the vehicle in appropriate and conventional coordinates such as are used in military maps to accurately locate the vehicle. The frequency of updating of the position information is somewhat arbitrary and depends on the accuracy which is required. The projector 60 may include a brightness control allowing adjustment for a variety of circumstances. An initial message may be displayed in a dim (less intense) brightness and the level of brightness increase as the turn becomes closer. Alternatively, the display could initially be smaller and become larger as the turn is approaching.

Figure 4:
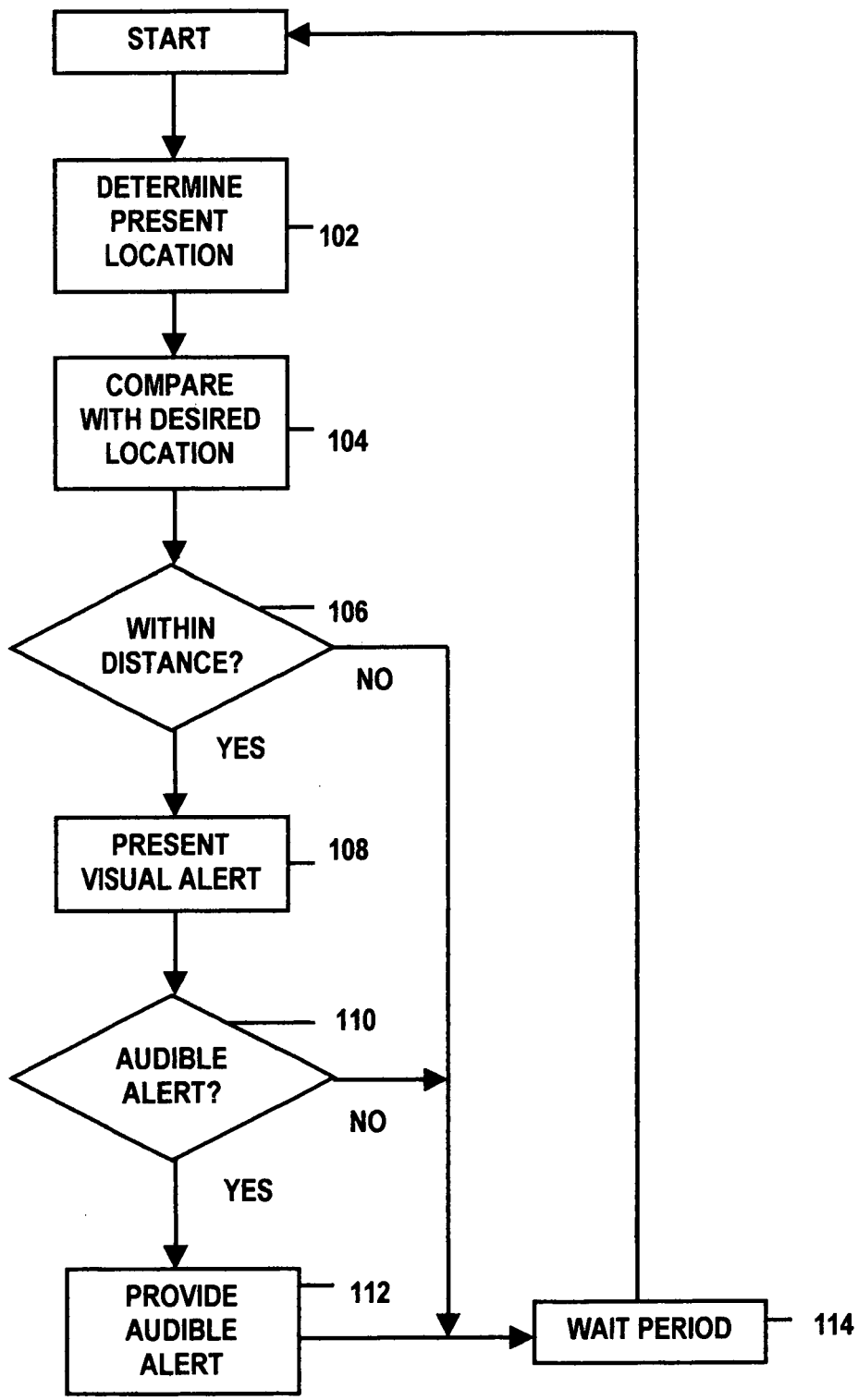
FIG. 4 is a flow chart for the system and method of the present invention.

Referring to FIG. 4, a block diagram of the present invention will be provided to illustrate one method of practicing the present invention. The location of a desired turn is stored in memory along with a message. Also stored in memory is advance warning information—how far in advance of the desired turn is an alert to be provided. The present location of the vehicle is periodically determined at block 102 and compared at block 104 with the desired turn location. If it is determined to be within an advance warning zone at block 106, then an alert is determined and presented to the driver at block 108. Block 110 determines whether an audible alert is to be provided. If it is, then at block 112 the content of the audible alert is determined and provided to the speaker(s) 6. Then, after a preset time period passes at block 114, control passes back to block 102 where a new position of the vehicle is determined and the process repeated.

Figure 5:
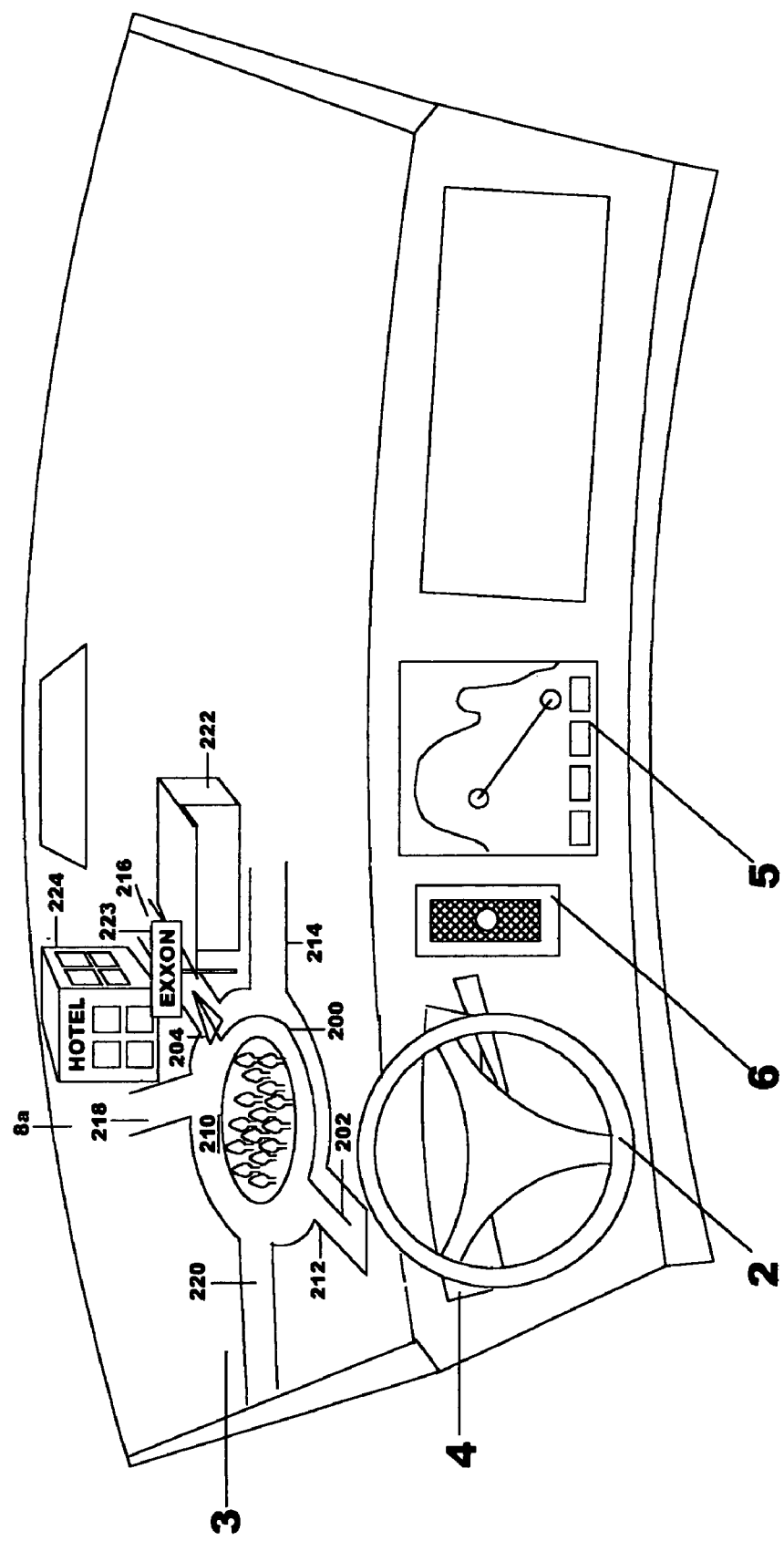
FIG. 5 is a view of the front of the vehicle similar to FIG. 2 but with an alternate message.

FIG. 5 illustrates a windshield with an alternate message in the form of a display 8a of the area. In this view an illustration of an intersection is displayed. A traffic circle 210 and its intersecting roads 212, 214, 216, 218 and 220 are shown. A desired path 200 is shown for the vehicle, perhaps in color or using sequential illumination not shown in this view, from its entry into the traffic circle 210 from road 212 (at 202) to its exit at road 216 (at 204). Landmarks are shown in this display 8a such as a service station 222 and its distinguishing sign 223 and a hotel 224. While it would be desirable to use a real-time image of the intersection showing its current condition and traffic (an image from a camera which can be obtained from an overhead camera and transmission in any known manner, including over the Internet), many intersections are not covered by a camera today, so the use of either stored images or constructed images of the intersection will be used where no real-time image is available for an intersection.

The present system may be implemented in one of a variety of ways, allowing the designer to provide messages as desired So, the system may be programmed to provide a first notice when the vehicle is 10 seconds or 1000 feet from the desired turn and a second message at 2 seconds or 200 feet from the turn. It may just as easily be programmed to provide additional message(s) if desired at different time(s) or distance(s).

The foregoing description of the present invention assumes that directional information would be one type of information which might be conveyed to a driver. While the system provided certainly has that capability, it is also possible to provide additional information to a driver. Some of the information might be based on positioning information and recent activity, such as providing current traffic information (accident blocking expressway at exit 5), road conditions (Federal Highway flooded at Main Street), alternate route information (take Main Street at exit 4) and/or weather information (heavy snowstorm around Cleveland). Additionally, the system could be used to provide news and sports information to a driver and could even be used to send e-mail and advertisements to a driver (tune up special at All-Tune only $30).

Another set of useful information to a driver might be a real-time camera image of the traffic at the next interchange on a limited access highway. As one is traveling down such a highway at rush hour, there may perhaps be multiple exits which one could use to go from the high speed limited access highway to surface streets with the attendant traffic and traffic signals. It may be desirable to take an interchange with less traffic rather than one which has more traffic, even if the latter one is closer to the destination. An image from a camera mounted above the interchange may have enough information so that the driver can determine whether to take the interchange or wait for another interchange.

Of course, many modifications of the present invention will be apparent to those skilled in the relevant art in view of the foregoing description of the preferred embodiment, taken together with the accompanying drawings. For example, the audible message on the necessary turn might be the only message provided. Multiple messages might be provided at predetermined intervals, such as a first message "turn left at Main in 1000 feet" might be followed by "turn left at Main in 600 feet" followed by "turn left at Main in 100 feet" as described above. Also, different audible messages could be programmed to provide an indication as to which message is provided (e.g., one chime for a first alert message that the turn is a first distance away, two chimes indicating that the turn is a second or lesser distance away and three chimes indicating that the least distance threshold has been met; alternatively, the audible message might be provided through a buzz using a short buzz, a long buzz and a combination of short and long buzzes for different types of messages).

In place of providing messages at one (or more) preset distance(s) from the desired turn, the system could be set to provide messages at approximately preset time interval(s) before the turn, based on the speed of the vehicle over some period of time, speed which may be determined by taking the differences in distances observed by the global positioning system GPS 95 at different times using the formula that velocity equals the change in distance divided by the change in time.

If a driver becomes lost or it becomes necessary to establish a new path to a destination (for example, because visual clues have become obsolete or a road has been temporarily closed), the present invention can be used to advantage as follows: the GPS system 95 identifies the current position of the vehicle and driver. A new path to the destination is established using an alternate path. While such an alternate path may also become obsolete (or have a detour also), the process may be repeated as necessary until a usable route is found.

There are various options for setting up the system initially. The origin and destination may be entered initially at a console in the vehicle or a GPS system can determine the initial coordinates of the vehicle. The driver may enter a destination (by address or zip code) or select one of a list of preprogrammed destinations for a locale. Alternatively, the origin and destination may be entered from a remote personal computer. Then, using mapping facilities which are available as software for the PC (see TravRoute software which is described at http://www.travroute.com) or available on-line (see http://www.freetrip.com). Once the route is identified, the PC software or the on-line system proposes one or more routes which the user can accept or modify to determine the path for the vehicle. Of course, the method of selecting a route is not particularly relevant to the present invention nor is the source of the directional information or how the system knows where the vehicle is located (for example, sensors along the roadway or odometer information could be used in place of the GPS system, if desired).

Additionally, many modifications can be made to the system implementation without departing from the spirit of the present invention. For example, the content of the message might be varied as desired, using descriptive symbols rather than words in a multi-lingual environment or a preferred language for any messages could be selected from a menu of supported languages. While the present invention has been programmed to provide alerting information about desired turns, a similar system could be programmed to provide information about landmarks and the environs to allow for sightseeing without a live guide by identifying the landmarks and providing information of interest. The system could also be used to locate amenities during traveling, such as rest areas, scenic vistas or filling stations, rather than preprogrammed turns along a route. The system also has the capability of displaying other information, such as e-mail, advertising, news and weather reports or traffic advisories when it is not being used to provide directional information for driving. Further, some of the features of the present invention can be used without the corresponding use of other features. The audible indications are considered an optional adjunct to the visual display of messages displayed on the windshield, but either one could be turned off, if desired. Any signal that a turn was missed may be included if desired or excluded or the system could include an option to turn on or off the feature of providing a missed turn indicator. Accordingly, the foregoing description of the preferred embodiment should be considered as merely illustrative of the principles of the present invention and not in limitation thereof. Since some of the communications which can be displayed using the present invention (e.g., sightseeing information about the historical significance of landmarks, news or weather or advertising or e-mail) might be distracting if presented while the car is in motion, by suitable programming the present invention could include controls which limit those messages to times when the vehicle is not in motion. Thus, detailed sightseeing information could be limited to those times when the vehicle is at rest (when the vehicle has pulled off to look at the landmarks) and e-mail and advertising might be displayed when the vehicle is stopped for a traffic signal or stopped due to rush hour congestion.

The present invention can be realized in hardware, software, or a combination of hardware and software. A data processing tool according to the present invention can be realized in a centralized fashion in one computer system, or in a distributed fashion where different elements are spread across several interconnected computer systems. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

"Computer program means" or "computer program" in the present context mean any expression, in any language, code or notation, of a set of instructions intended to cause a system having an information processing capability to perform a particular function either directly or after either or both of the following a) conversion to another language, code or notation; b) reproduction in a different material form.

While the present invention is described in the context of an apparatus and a method of providing driving directions, the present invention may be implemented in the form of a service where the processing of information is located apart from the car and transmitted to the car for communication to the driver.

Having thus described the invention, what is claimed is:

1. A method of providing driving instructions including the steps of
    sensing a position of the vehicle;
    comparing the position of the vehicle with a desired location;
    if the vehicle is in a predetermined position, generating a signal which indicates that the driver should take an action, wherein the predetermined position is determined based upon an estimated time when the driver should take the action;
    in response to the signal, displaying on a windshield of the vehicle a message indicating the action the driver should take the action along with a virtual image of an area around the desired location, the image including at least one landmark; and
    terminating the displaying of the message and virtual image prior to when the driver should take the action.

2. A method including the steps of claim 1 wherein the step of generating a signal includes the step of providing an audible signal indicating that the driver should take an action.

3. A method including the steps of claim 2 wherein the step of providing an audible signal indicates that a message is displayed on the windshield.

4. A method including the steps of claim 2 wherein the step of providing an audible signal includes the step of broadcasting the message on a speaker.

5. A method including the steps of claim 1 wherein the method further includes the step of displaying a distance to the desired action.

6. A method including the steps of claim 1 where the method further includes the step of determining the speed of the vehicle and providing an indication of the desired action a predetermined time period in advance of the desired action.

7. A method including the steps of claim 1 wherein the method further includes the step of determining when the vehicle has passed the desired location and providing an indication that the driver has missed a turn, whereby the driver may take action more quickly to recover from missing the desired location.

8. A program stored on a storage medium for generating a displayed message to a driver of a vehicle on the windshield of the vehicle, the program comprising:
    a program element for determining a message for display, the message indicating an action the driver should take;
    a program element for determining an appropriate time for displaying the message, the appropriate time being based on an estimated time when the driver should take the action;
    a program element coupled to a projector for providing the message for display at the appropriate time for the display, whereby the message can be displayed to the driver on the windshield of his car at the appropriate time, and for providing a virtual image of an area corresponding to a a location at which the driver should take the action, the virtual image including at least one landmark; and
    a program element for terminating the displaying of the message and virtual image prior to when the vehicle will reach the location at which the driver should take the action.

9. A program of the type described in claim 8 wherein the program element for determining the message for display includes a stored program indicating at least one desired driving direction and a location for that driving direction to be displayed and the program further includes a program element for determining when the vehicle is in the location for the driving direction to be displayed.

10. A program of the type described in claim 9 wherein the program element for determining when the car is in the location for the direction to be displayed includes a program element for receiving global positioning information.

11. A program of the type described in claim 9 wherein the program element for storing at least one driving direction includes a program element for receiving the driving instruction from a remote source.

12. A program of the type described in claim 9 where the program element for storing at least one driving direction includes a stored navigational program.

13. A system for displaying information to a driver in a vehicle comprising:
    a location system which determines the location of the vehicle;
    a storage device which provides a picture of a roadway near a desired location at which a driver action should be taken; and
    a device which generates a display of the picture of the roadway on the windshield of the vehicle allowing the driver of the vehicle to see the display without removing his eyes from the roadway, wherein the picture includes at least one image of a landmark;
    wherein the device generates the display based upon at least one of an estimated distance from the vehicle location to the desired location and an estimated time for the vehicle to reach the desired location, and wherein the device terminates the display prior to the vehicle reaching the desired location.

14. A system of the type described in claim 13 wherein the picture displayed is a live picture.

15. A system of the type described in claim 14 wherein the live picture is from a camera mounted over the roadway.

16. A system of the type described in claim 13 wherein the display includes driving directions.

17. A system of the type described in claim 16 wherein the display includes driving directions in the form of a turn indicated on the picture of the roadway.

18. A system of the type described in claim 13 wherein the picture is a picture taken previously and stored in memory.

19. A method for displaying information to a vehicle driver comprising the steps of:
    determining a first position of the vehicle;
    finding a picture of an intersection at which a driver action should be taken;
    displaying the picture of the intersection on the windshield of the vehicle so that the driver can see the picture while looking out the windshield, wherein the picture of the intersection includes at least one image of a landmark, and wherein the picture is displayed based upon at least one of an estimated distance from the first determined vehicle position to the intersection and an estimated time at which the driver action should be taken given the determined vehicle position; and terminating the displaying of the picture prior to the vehicle reaching the intersection given a second determined position of the vehicle.

20. A method of displaying information including the steps of claim 19 wherein the step of finding a picture includes the step of retrieving a stored picture of the roadway from memory.

21. A method of displaying information including the steps of claim 19 wherein the step of finding a picture includes the step of receiving a live picture of the roadway.

22. A method of displaying information including the steps of claim 21 wherein the step of finding a picture includes the step of receiving a live picture from a camera mounted above the intersection.

23. A method of displaying information including the steps of claim 19 wherein the step of displaying a picture of the intersection further includes the step of adding driving instructions to the display.

24. A method including the steps of claim 1, wherein the at least one attribute is a size of the at least one landmark, the size increasing as the vehicle moves closer to the at least one landmark.

25. A method including the steps of claim 1, wherein the at least one attribute is a brightness of the landmark, the brightness increasing as the vehicle moves closer to the at least one landmark.

26. The system of claim 13, wherein the display further includes text superimposed on the picture, the text providing information corresponding to the landmark.

27. A method including the steps of claim 19, further comprising superimposing on the display textual information corresponding to the landmark.

28. A method including the steps of claim 1, further comprising displaying on the windshield of the vehicle information corresponding to the at least one landmark and information corresponding to the environs of the desired location.

29. A method including the steps of claim 1, further comprising displaying on the windshield of the vehicle at least one of an e-mail message, an advertisement, a news report, a weather report, and a traffic advisory.

30. A method of providing driving instructions including the steps of
sensing a position of the vehicle;
comparing the position of the vehicle with a desired location;
if the vehicle is in a predetermined position, generating a signal which indicates that the driver should take an action, wherein the predetermined position is determined based upon an estimated distance to a location at which the driver should take the action;
in response to the signal, displaying on a windshield of the vehicle a message indicating the action the driver should take the action along with a virtual image of an area around the desired location, the image including at least one landmark; and
terminating the displaying of the message and virtual image prior to the vehicle reaching the location at which the driver should take the action.

31. A method including the steps of claim 30 wherein the step of generating a signal includes the step of providing an audible signal indicating that the driver should take an action.

32. A method including the steps of claim 31 wherein the step of providing an audible signal indicates that a message is displayed on the windshield.

33. A method including the steps of claim 32 wherein the step of providing an audible signal includes the step of broadcasting the message on a speaker.

34. A method including the steps of claim 30 wherein the method further includes the step of displaying a distance to the desired action.

35. A method including the steps of claim 30 where the method further includes the step of determining the speed of the vehicle and providing an indication of the desired action a predetermined time period in advance of the desired action.

36. A method including the steps of claim 30 wherein the method further includes the step of determining when the vehicle has passed the desired location and providing an indication that the driver has missed a turn, whereby the driver may take action more quickly to recover from missing the desired location.

37. A method including the steps of claim 30, further comprising displaying on the windshield of the vehicle information corresponding to the at least one landmark and information corresponding to the environs of the desired location.

38. A method including the steps of claim 30, further comprising displaying on the windshield of the vehicle at least one of an e-mail message, an advertisement, a news report, a weather report, and a traffic advisory.

* * * * *